US012671105B2

(12) United States Patent

Kim et al.

(10) Patent No.: US 12,671,105 B2

(45) Date of Patent: Jun. 30, 2026

(54) SECONDARY BATTERY AND DEVICE INCLUDING THE SAME

(71) Applicant: LG ENERGY SOLUTION, LTD., Seoul (KR)

(72) Inventors: Soo Jung Kim, Daejeon (KR); Duk Hyun Ryu, Daejeon (KR); Jinsoo Kim, Daejeon (KR); Mingi Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 744 days.

(21) Appl. No.: 17/642,934

(22) PCT Filed: Oct. 20, 2020

(86) PCT No.: PCT/KR2020/014318

§ 371 (c)(1),
(2) Date: Mar. 14, 2022

(87) PCT Pub. No.: WO2021/101082

PCT Pub. Date: May 27, 2021

(65) Prior Publication Data

US 2022/0367901 A1 Nov. 17, 2022

(30) Foreign Application Priority Data

Nov. 20, 2019 (KR) ........................ 10-2019-0149721

(51) Int. Cl.
H01M 50/193 (2021.01)
H01M 10/04 (2006.01)

(Continued)

(52) U.S. Cl.
CPC ... H01M 10/0431 (2013.01); H01M 10/0422 (2013.01); H01M 50/121 (2021.01); H01M 50/14 (2021.01)

(58) Field of Classification Search
None
See application file for complete search history.

(56) References Cited

U.S. PATENT DOCUMENTS 5,516,600 A 5/1996 Cherng
7,776,465 B1 * 8/2010 Hatazawa ........... H01M 50/133
429/57

(Continued)

FOREIGN PATENT DOCUMENTS

CN 100530768 C 8/2009
CN 202695597 U 1/2013
(Continued)

OTHER PUBLICATIONS

JP-3533893-B2 (Year: 2004).*
(Continued)

*Primary Examiner* — Tracy M Dove

(74) *Attorney, Agent, or Firm* — Morgan, Lewis & Bockius LLP

(57) ABSTRACT

A secondary battery according to one embodiment of the present disclosure includes: a jelly-roll type electrode assembly; a top insulator located at the top of the electrode assembly; and a bottom insulator located at the bottom of the electrode assembly, wherein at least one of the top insulator and the bottom insulator includes a temperature-sensitive polymer that swells in accordance with a temperature rise.

10 Claims, 3 Drawing Sheets

(51) Int. Cl.
  *H01M 50/121* (2021.01)
  *H01M 50/14* (2021.01)

(56) References Cited

U.S. PATENT DOCUMENTS

| | | |
|---|---|---|
| 2008/0057809 A1 | 3/2008 | Rock |
| 2010/0273073 A1 | 10/2010 | Schumm, Jr. |
| 2011/0070501 A1 | 3/2011 | Chang et al. |
| 2014/0178725 A1 | 6/2014 | Kim et al. |
| 2017/0263915 A1 | 9/2017 | Umeyama et al. |
| 2017/0317326 A1 | 11/2017 | Fujikawa et al. |
| 2018/0062120 A1 | 3/2018 | Kim et al. |
| 2020/0144563 A1* | 5/2020 | Lee .................. H01M 10/0422 |
| 2020/0185666 A1 | 6/2020 | Lee et al. |
| 2021/0367292 A1 | 11/2021 | Takahashi |

FOREIGN PATENT DOCUMENTS

| | | | |
|---|---|---|---|
| CN | 103765654 A | | 4/2014 |
| CN | 106450064 A | | 2/2017 |
| CN | 107180989 A | | 9/2017 |
| CN | 108250400 A | | 7/2018 |
| CN | 110098371 A | | 8/2019 |
| CN | 209232889 U | | 8/2019 |
| CN | 209447923 U | | 9/2019 |
| JP | 2002-008628 A | | 1/2002 |
| JP | 2002-170598 A | | 6/2002 |
| JP | 3533893 B2 | * | 5/2004 |
| JP | 2007-172967 A | | 7/2007 |
| JP | 2007-194069 A | | 8/2007 |
| JP | 2008-057100 A | | 3/2008 |
| JP | 2014-072050 A | | 4/2014 |
| JP | 2017-162724 A | | 9/2017 |
| KR | 10-2006-0032369 A | | 4/2006 |
| KR | 10-2008-0009462 A | | 1/2008 |
| KR | 10-2010-0060723 A | | 6/2010 |
| KR | 10-2010-0116141 A | | 10/2010 |
| KR | 10-2013-0089375 A | | 8/2013 |
| KR | 10-2014-0017743 A | | 2/2014 |
| KR | 10-2014-0087124 A | | 7/2014 |
| KR | 10-2016-0034082 A | | 3/2016 |
| KR | 10-2017-0072525 A | | 6/2017 |
| KR | 10-2018-0024162 A | | 3/2018 |
| WO | 2007-064117 A1 | | 6/2007 |
| WO | 2013/037120 A1 | | 3/2013 |
| WO | 2016/067510 A1 | | 5/2016 |
| WO | 2018/110232 A1 | | 6/2018 |
| WO | 2019/146926 A1 | | 8/2019 |

OTHER PUBLICATIONS

Office Action issued in corresponding Japanese Patent Application No. 2022-508940, dated Feb. 28, 2023.

International Search Report (with partial translation) and Written Opinion issued in corresponding International Patent Application No. PCT/KR2020/014318, dated Feb. 2, 2021.

Namgung et al., "Thermo-Responsive Polymers for Gene Delivery", Biomaterials Research (2010) 14( 2 ) : 86-94.

Yang et al., "Study on Rheological Characterization of Polyacrylonitrile/ Dimethyl Sulfoxide Solution with Change of Storage Times and Temperatures", Composites Research, vol. 32, No. 1, pp. 71-77 (2019).

Piao et al., "Syntheses and Swelling Behaviors of Poly(N-isopropylacrylamide-co-acrylonitrile) Hydrogels" Polymer (Korea), vol. 31, No. 4, pp. 349-355, 2007.

Slaughter et al.,. Dynamic swelling behavior of interpenetrating polymer networks in response to temperature and pH, Journal of Applied Polymer Science, Mar. 4, 2015 (final edited form Jun. 20, 2015), pp. 1-26.

Office Action issued in corresponding Chinese Patent Application No. 202080064221.9, dated Jul. 29, 2023. Note: KR 10-2006-0032369, KR 10-2010-0060723, JP 2008-057100 cited therein is already of record.

Extended European Search Report issued in corresponding European Patent Application No. dated, Jun. 16, 2023. Note: JP 2017-162724 cited therein is already of record.

Office Action dated Sep. 28, 2024 issued in Chinese Patent Application No. 202080064221.9. Note: CN 110098371 A cited therein is already of record.

Office Action dated Apr. 18, 2025, of the corresponding Korean Patent Application No. 10-2019-0149721.

* cited by examiner

【FIG. 1】
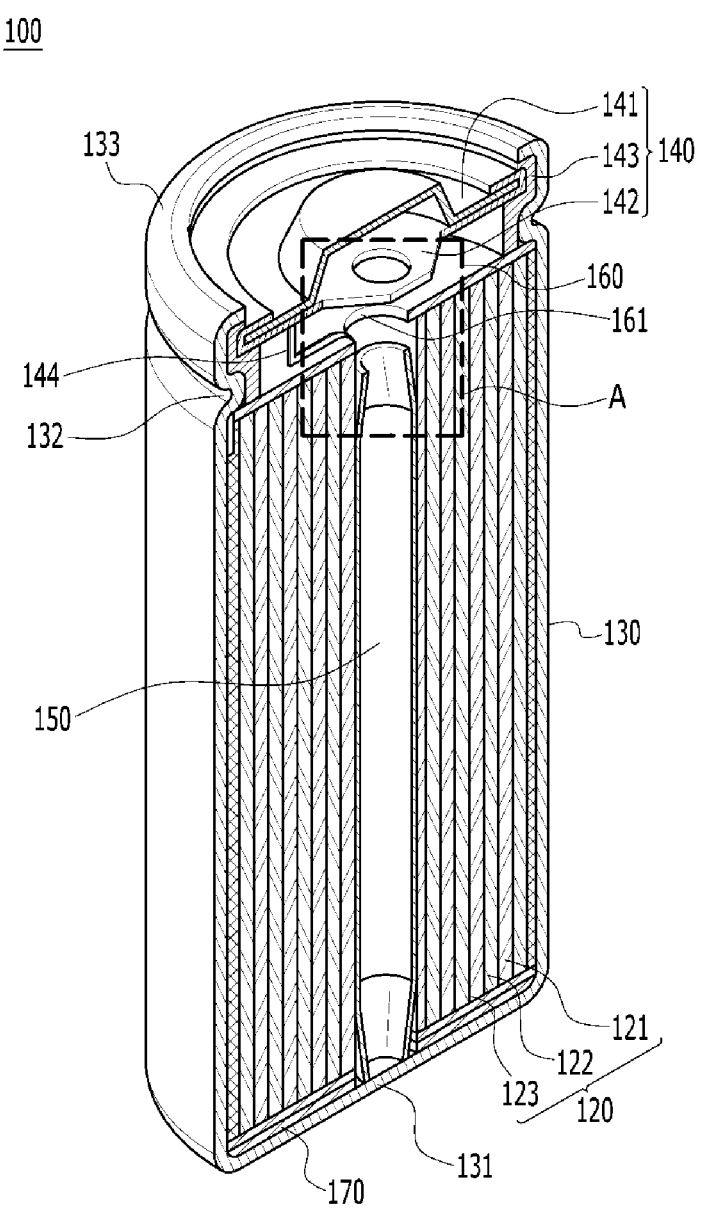

【FIG. 2】
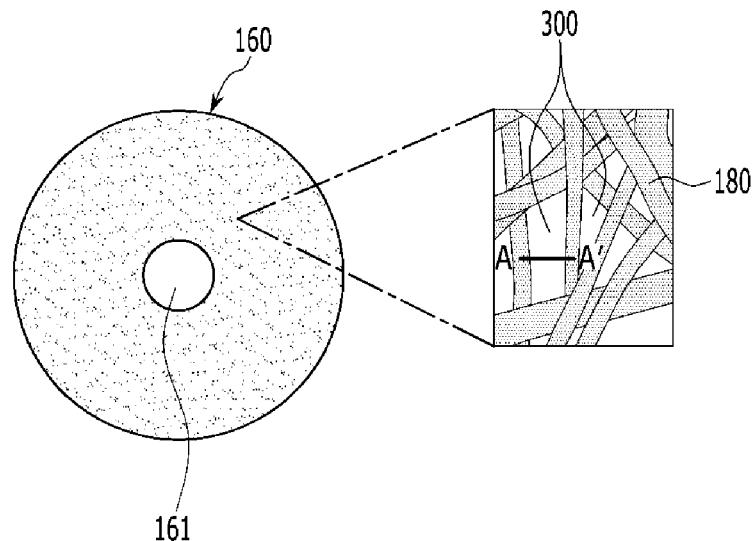
【FIG. 3】
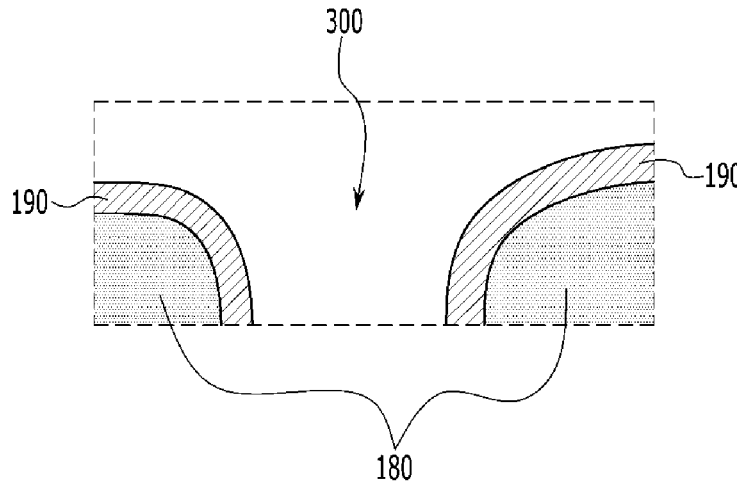

【FIG. 4】
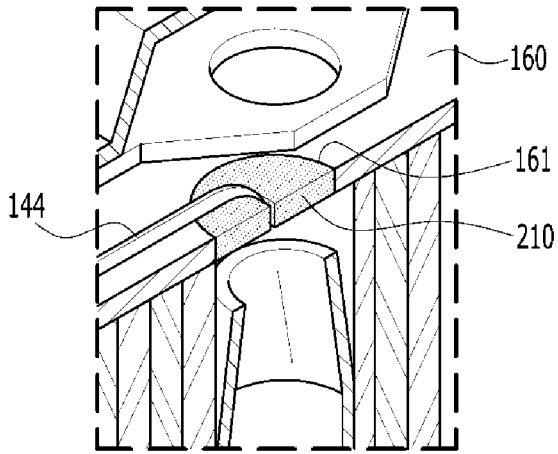
【FIG. 5】
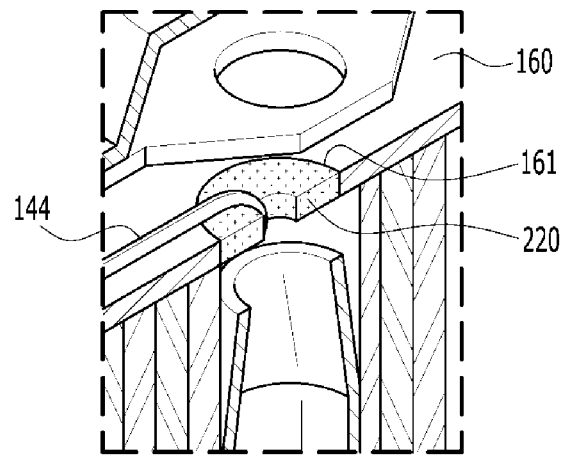

SECONDARY BATTERY AND DEVICE INCLUDING THE SAME

CROSS CITATION WITH RELATED APPLICATION(S)

This application claims the benefit of Korean Patent Application No. 10-2019-0149721 filed on Nov. 20, 2019 with the Korean Intellectual Property Office, the disclosure of which is incorporated herein by reference in its entirety.

TECHNICAL FIELD

The present disclosure relates to a secondary battery and a device including the same, and more particularly to a secondary battery having improved safety against external impact and vibration, and a device including the same.

BACKGROUND ART

As the demands for portable electronic products such as notebooks, video cameras and cellular phones are rapidly increased in these days, and development of electric vehicles, energy storage batteries, robots, satellites, etc. is under active progress, numerous studies are being made on secondary batteries being used as the driving power source.

The electrode assembly mounted in the battery case is a power generating element, having a cathode/separator/anode stack structure, which can be charged and discharged, and the electrode assembly is classified into a jelly-roll type, a stacked type and a stacked/folded type. The jelly-roll type electrode assembly is configured to have a structure in which a long sheet type cathode and a long sheet type anode, to which active materials are applied, are wound in a state where a separator is interposed between the cathode and the anode, the stacked type electrode assembly is configured to have a structure in which a large number of cathodes having a predetermined size and a large number of anodes having a predetermined size are sequentially stacked in a state in which separators are interposed between the cathodes and the anodes, and the stacked/folded type electrode assembly is a combination of the jelly-roll type electrode assembly and the stacked type electrode assembly. Among them, the jelly-roll type electrode assembly has advantages in that manufacturing is easy and an energy density per unit weight is high.

Such a secondary battery includes, for example, nickel-cadmium battery, nickel hydrogen battery, nickel zinc battery, lithium secondary battery, and the like. Among these, since the lithium secondary battery has the advantages in that it has almost no memory effect compared to nickel-based secondary battery, and thus, can be charged and discharged freely, and have very low self-discharge rate, high operating voltage, and high energy density per unit weight, it is widely used in the field of advanced electronic devices.

Based on the shape of a battery case, a secondary battery may be classified into a cylindrical battery where an electrode assembly is mounted in a cylindrical metal can, a prismatic battery where an electrode assembly is mounted in a prismatic metal can, or a pouch-shaped battery where an electrode assembly is mounted in a pouch-shaped case formed of an aluminum laminate sheet. Among them, the cylindrical battery has the advantages in that it has relatively large capacity and is structurally stable. However, the cylindrical battery may be greatly affected by vibrations and impacts in the vertical direction rather than the left and right directions in terms of its structure. When such electrode assembly is exposed to vibrations and impacts in the vertical direction without any special measures, damage may occur to the electrode assembly or internal components, which results in deterioration of performance.

Therefore, there is a need to develop a secondary battery capable of maintaining its performance even when exposed to strong vibration or impact.

DETAILED DESCRIPTION OF THE INVENTION

Technical Problem

Embodiments of the present disclosure have been designed to solve the above-mentioned problems of the previously proposed methods, and an object of the present disclosure is to provide a secondary battery having improved safety even when exposed to external vibration or impact by fixing the internal electrode assembly, and a device including the same.

However, the problem to be solved by embodiments of the present disclosure is not limited to the above-described problems, and can be variously expanded within the scope of the technical idea included in the present disclosure.

Technical Solution

A secondary battery according to the embodiments of the present disclosure includes: a jelly-roll type electrode assembly; a top insulator located at the top of the electrode assembly; and a bottom insulator located at the bottom of the electrode assembly, wherein at least one of the top insulator and the bottom insulator includes a temperature-sensitive polymer that swells in accordance with a temperature rise.

The temperature-sensitive polymer may include at least one of pNIPAAm (poly(N-isopropylacrylamide)), pDEAM (poly(N,N-diethylacrylamide)), pNEMAM (poly(N-ethylmethyacrylamide)), pMVE (poly(methyl vinyl ether)), pEOVE (poly(2-ethoxyethyl vinyl ether)), pNVCa (poly(N-vinylcaprolactam)), pNVIBAM (poly(N-vinylisobutyramide)) and pNVBAM (poly(N-vinyl-n-butyramide)).

At least one of the top insulator and the bottom insulator may include an insulating fiber and a coating layer coated on a surface of the insulating fiber, and the coating layer may include the temperature-sensitive polymer.

The insulating fiber may include at least one of polyethylene, polybutylene, polystyrene, polyethylene terephthalate, polypropylene, glass fiber, natural rubber, and synthetic rubber.

The secondary battery may further include a cathode tab extending upward from the electrode assembly, wherein an opening part through which the cathode tab penetrates is formed in the top insulator.

A gel-type member may be located between the inner wall of the opening part and the cathode tab.

The gel-type member may include the temperature-sensitive polymer.

An inner wall coating layer containing a self-healing binder may be formed on the inner wall of the opening part.

The self-healing binder may include at least one of a CMC (ceramic matrix composite) material, an arginate material, and a chitosan material.

The secondary battery may further include a cylindrical case for storing the electrode assembly.

The electrode assembly may be fixed between the top insulator and the bottom insulator.

Advantageous Effects

According to the embodiments of the present disclosure, a secondary battery capable of fixing the electrode assembly even when exposed to external vibration or impact through an insulator containing a temperature-sensitive polymer can be provided. Therefore, the safety and durability of the secondary battery and the device including the same can be improved.

BRIEF DESCRIPTION OF THE DRAWINGS

FIG. 1 is a cross-sectional perspective view of a secondary battery according to one embodiment of the present disclosure;

FIG. 2 is a plan view illustrating a top insulator contained in the secondary battery of FIG. 1;

FIG. 3 is a view showing a part of a cross section taken along the line A-A' of FIG. 2; and FIGS. 4 and 5 are enlarged partial views showing the portion "A" of FIG. 1.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of the description, and the present disclosure is not necessarily limited to those illustrated in the drawings. In the drawings, the thickness of layers, regions, etc. are exaggerated for clarity. In the drawings, for convenience of the description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 1 is a cross-sectional perspective view of a secondary battery 100 according to one embodiment of the present disclosure.

Referring to FIG. 1, the secondary battery 100 according to the present embodiment includes a jelly-roll type electrode assembly 120, a top insulator 160 located at the top of the electrode assembly 120 and a bottom insulator 170 located at the bottom of the electrode assembly 120.

The electrode assembly 120 has a jelly-roll type structure in which a large number of cathodes 121 and a large number of negative electrodes 122 are wound with separators 123 interposed therebetween, and a center pin 150 may be inserted in the central part thereof.

At least one of the top insulator 160 and the bottom insulator 170 may include a temperature-sensitive polymer that swells in accordance with a temperature rise. However, it is preferable that both the top insulator 160 and the bottom insulator 170 include a temperature-sensitive polymer for securing safety against vibration and the like.

The temperature-sensitive polymer means a polymer that reacts sensitively to temperature among various stimuli and causes a rapid physical or chemical change even by small temperature stimulation.

The temperature-sensitive polymer causing a volume change in accordance with a temperature may include at least one of pNIPAAm (poly(N-isopropylacrylamide)), pDEAM (poly(N,N-diethylacrylamide)), pNEMAM (poly(N-ethylmethacrylamide)), pMVE (poly(methyl vinyl ether)), pEOVE (poly(2-ethoxyethyl vinyl ether)), pNVCa (poly(N-vinylcaprolactam)), pNVIBAM (poly(N-vinylisobutyramide)) and pNVBAM (poly(N-vinyl-n-butyramide)).

The temperature-sensitive polymer is a polymer whose properties change in accordance with an external temperature, and may cause a reversible volume phase transition at a specific temperature. That is, the top insulator 160 and the bottom insulator 170 of the present disclosure including the temperature-sensitive polymer swell as the temperature rises, and then may again return to its original state at the time of temperature restoration.

Therefore, when the temperature of the secondary battery 100 rises along with external vibration or impact, the top insulator 160 and the bottom insulator 170 containing the temperature-sensitive polymer can swell to fix the electrode assembly 120 positioned therebetween. In particular, it may be useful for causing a buffer action against vibration in the vertical direction and maintaining the performance of the secondary battery 100.

Meanwhile, the top insulator 160 and the bottom insulator 170 containing the temperature-sensitive polymer swell when the temperature is about 45° C. or more, thereby protecting the electrode assembly 120 from vibration.

FIG. 2 is a plan view illustrating a top insulator contained in the secondary battery of FIG. 1. In the following, the top insulator 160 is described to avoid repetition of the description, wherein the characteristics which are either identical or similar to those of the top insulator 160 described later may be applied even to the bottom insulator 170 as well. FIG. 3 is a view showing a part of a cross section taken along the line A-A' of FIG. 2.

Referring to FIGS. 2 and 3, the top insulator 160 may include insulating fibers 180, and such insulating fibers 180 may be entangled without having directivity to form a non-woven fabric-like shape. The insulating fiber 180 may include at least one of polyethylene, polybutylene, polystyrene, polyethylene terephthalate, polypropylene, glass fiber, natural rubber, and synthetic rubber.

Due to the insulating fibers 180, the top insulator 160 exhibits electrical insulating properties, and in FIG. 1, it is possible to prevent the occurrence of a short circuit by contacting the electrode assembly 120 with the bottom part 131 of the battery case 130.

Meanwhile, although not specifically shown, the bottom insulator 170 may also include the insulating fiber, and exhibit electrical insulating properties, so that it is possible to it is possible to prevent the occurrence of a short circuit by contacting the electrode assembly 120 with the bottom part 131 of the battery case 130.

A large number of empty spaces may be formed between the insulating fibers 180, and this top insulator 160 is impregnated into a solution containing a temperature-sensitive polymer, and then washed and dried, so that a coating layer 190 containing a temperature-sensitive polymer may be formed on the insulating fiber 180. That is, the top insulator 160 may include insulating fibers 180 entangled without having directivity and a coating layer 190 coated on the surfaces of the insulating fibers 180, and the coating layer 190 may include the temperature-sensitive polymer.

However, due to the large number of empty spaces between the insulating fibers 180, open pores 300 may be formed in the top insulator 160. The pores 300 in this embodiment means a passage-like structure in which some of the empty spaces between the insulating fibers 180 are interconnected and formed to penetrate through the upper and lower surfaces of the top insulator 160.

As shown in FIG. 3, even if the coating layer 190 is formed on the surface of the insulating fiber 180, it does not block the open pores 300 formed in the top insulator 160, and does not disturb the flow of gas, so that the gas permeability of the top insulator 160 is not deteriorated.

Meanwhile, referring back to FIG. 1, the secondary battery 100 can be manufactured by storing the electrode assembly 120 in a battery case 130, injecting an electrolyte solution into the battery case 130, and then connecting a cap assembly 140 to the top of the battery case 130.

At this time, the battery case 130 may include a beading part 132 and a crimping part 133.

The beading part 132 refers to a portion in which a part of the battery case 130 is recessed in the central direction of the electrode assembly 120, which is for stable coupling of the cap assembly 140 and preventing the flow of the electrode assembly 120.

The crimping part 133 is located above the beading part 132 and refers to a part surrounding the cap assembly 140, which is for stable coupling of the cap assembly 140.

The cap assembly 140 may include a top cap 141 forming a cathode terminal, a cap plate 142 to which the cathode tab 144 extending upward from the electrode assembly 120 is connected, and an airtight gasket 143.

The gasket 143 is mounted on the upper inner surfaces of the crimping part 133 and the beading part 132, thereby increasing a sealing force between the cap assembly 140 and the battery case 130.

The battery case 130 may be a cylindrical case or a prismatic case, but it is preferably a cylindrical case as shown in FIG. 1.

As described above, the cathode tab 144 may be extended upward from the electrode assembly 120. Specifically, it may be extended from the cathode 121 of the electrode assembly 120.

The cathode tab 144 is connected to a cap plate 142, so that a top cap 141 can operate as a cathode terminal. An opening part 161 is formed in a top insulator 160, and the cathode tab 144 can penetrate through the opening part 161 to be connected to the cap plate 142.

FIGS. 4 and 5 are views for explaining a modified embodiment of the present disclosure, respectively, and are enlarged partial views showing the portion "A" of FIG. 1.

First, referring to FIG. 4, the gel type member 210 can be located between the inner wall of the opening part 161 and the cathode tab 144.

As described above, the cathode tab 144 penetrates through the opening part 161 to be connected to the cap plate 142. If there is no separate fixing device for the cathode tab 144, the cathode tab 144 is short-circuited by external vibration or impact.

Thus, in this embodiment, the gel type member 210 located between the inner wall of the opening part 161 and the cathode tab 144 may be provided to fill the internal space of the opening part 161. Therefore, since the cathode tab 144 can be strongly fixed, it is possible to prevent a short circuit of the cathode tab 144 due to external vibration or impact.

The gel-type member 210 may include the temperature-sensitive polymer, and the temperature-sensitive polymer may include at least one of pNIPAAm (poly(N-isopropylacrylamide)), pDEAM (poly(N,N-diethylacrylamide)), pNEMAM (poly(N-ethylmethacrylamide)), pMVE (poly (methyl vinyl ether)), pEOVE (poly(2-ethoxyethyl vinyl ether)), pNVCa (poly(N-vinylcaprolactam)), pNVIBAM (poly(N-vinylisobutyramide)) and pNVBAM (poly(N-vinyl-n-butyramide)).

Therefore, when the temperature of the secondary battery 100 rises along with external vibration or impact, the gel type member 210 can swell and fill all the space formed by the opening part 161, so the cathode tab 144 can be fixed more firmly.

Next, referring to FIG. 5, an inner wall coating layer 220 containing a self-healing binder is formed on the inner wall of the opening part 161.

The self-healing binder may include at least one of a CMC (ceramic matrix composite) material, an arginate material, and a chitosan material. Accordingly, the inner wall coating layer 220 can impart self-restoring properties using a reversible covalent bond, so that the inner wall coating layer 220 can exhibit temperature-sensitive properties.

In one example of a reversible covalent bond, as a hydrophilic polyethylene oxide (PEO) polymer changes to a hydrophobic polyphenyleneoxide (PPO) at about 15 degrees Celsius or more, it may exhibit temperature-sensitive properties.

When the temperature rises, the inner wall coating layer 220 can expand depending on the temperature-sensitive properties to strongly fix the cathode tab 144, and it is possible to prevent a short circuit of the cathode tab 144 due to external vibration or impact.

Meanwhile, referring back to FIG. 1, a center pin 150 generally includes a metallic material to impart a predetermined strength, and is formed in a cylindrical structure in which a plate material is bent into a round shape. The center pin 150 can function as a passage for fixing and supporting the electrode assembly 120 and releasing a gas generated by an internal reaction during charging/discharging and operation, in addition to self-heating described later.

Meanwhile, the electrolyte solution injected into the battery case 130 may be a lithium salt-containing non-aqueous electrolyte solution, and the lithium salt-containing non-aqueous electrolyte solution is composed of a non-aqueous electrolyte solution and a lithium salt. The non-aqueous electrolyte used herein includes a non-aqueous organic solvent, an organic solid electrolyte, an inorganic solid electrolyte, or the like, but is not limited thereto.

As examples of the non-aqueous electrolyte, mention may be made of non-protic organic solvents, such as N-methyl-2-pyrrolidinone, propylene carbonate, ethylene carbonate, butylene carbonate, dimethyl carbonate, diethyl carbonate, gamma-butyro lactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$.

The lithium salt is a material that is readily soluble in the above-mentioned non-aqueous electrolyte. The lithium salt may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, the non-aqueous electrolyte may further include, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like. In some cases, in order to impart incombustibility, the electrolyte may further include halogen-containing solvents, such as carbon tetrachloride and ethylene trifluoride. Furthermore, in order to improve high-temperature retention characteristics, the electrolyte may further include carbon dioxide gas. In addition, it may further include fluoro-ethylene carbonate (FEC), propene sultone (PRS), and the like.

In one specific example, lithium salts such as $LiPF_6$, $LiClO_4$, $LiBF_4$ and $LiN(SO_2CF_3)_2$ are added to a mixed solvent of a cyclic carbonate of EC or PC as a highly dielectric solvent and a linear carbonate of DEC, DMC or EMC as a low-viscosity solvent to prepare a lithium salt-containing non-aqueous electrolyte.

The secondary battery described above can be applied to various devices. These devices may be applied to vehicle means such as an electric bicycle, an electric vehicle, a hybrid vehicle, but the present disclosure is not limited thereto and can be applied to various devices that can use the battery module or the battery pack including the same.

Although the preferred embodiments of the present disclosure have been described in detail above, the scope of the present disclosure is not limited thereto, and various modifications and improvements can be made by those skilled in the art using the basic concepts of the present disclosure defined in the following claims also, without departing from the scope of rights.

DESCRIPTION OF REFERENCE NUMERALS

100: secondary battery
120: electrode assembly
130: battery case
131: bottom part
132: beading unit
133: crimping unit
140: cap assembly
150: center pin
160: top insulator
161: opening part
170: bottom insulator

The invention claimed is:

1. A secondary battery comprising:
a jelly-roll electrode assembly;
a top insulator at a top of the electrode assembly, the top insulator including a main body of insulating fibers and a gel member;
a bottom insulator at a bottom of the electrode assembly;
a cathode tab extending upward from the electrode assembly;
a battery case in which the electrode assembly, the top insulator, and the bottom insulator are housed; and
a cap assembly connected to the top of the battery case,
wherein the top insulator is located between the electrode assembly and the cap assembly,
wherein the cap assembly includes a top cap forming a cathode terminal and a cap plate to which the cathode tab extending upward from the electrode assembly is connected,
wherein the battery case includes a crimping part surrounding the cap assembly,
wherein a gasket is located between the crimping part and the cap assembly,
wherein the main body of the top insulator includes an opening part through which the cathode tab penetrates,
wherein the gel member is disposed between an inner wall of the opening part and the cathode tab,
wherein the gel member of the top insulator includes a temperature-sensitive polymer that swells in accordance with a temperature rise of the temperature-sensitive polymer, and
wherein the temperature-sensitive polymer includes at least one of pNIPAAm (poly(N-isopropylacrylamide)), pDEAM (poly(N,N-diethylacrylamide)), pNEMAM (poly(N-ethylmethacrylamide)), pMVE (poly(methyl vinyl ether)), pEOVE (poly(2-ethoxyethyl vinyl ether)), pNVCa (poly(N-vinylcaprolactam)), pNVIBAM (poly(N-vinylisobutyramide)) and pNVBAM (poly(N-vinyl-n-butyramide)).

2. The secondary battery according to claim 1, wherein a surface of the main body of the insulating fibers are coated with the temperature-sensitive polymer.

3. The secondary battery according to claim 2, wherein the insulating fiber includes at least one of polyethylene, polybutylene, polystyrene, polyethylene terephthalate, polypropylene, glass fiber, natural rubber, and synthetic rubber.

4. The secondary battery according to claim 1, wherein an inner wall coating layer containing a binder having self-restoring properties using a reversible covalent bond is disposed on the inner wall of the opening part.

5. The secondary battery according to claim 4, wherein the binder includes at least one of a CMC (ceramic matrix composite) material, an arginate material, and a chitosan material.

6. The secondary battery according to claim 1, wherein the electrode assembly is fixed between the top insulator and the bottom insulator.

7. A device comprising at least one secondary battery according to claim 1.

8. The secondary battery according to claim 1, wherein the gel member is configured to swell to fill all of the space of the opening part between the inner wall and the cathode tab.

9. The secondary battery according to claim 1, wherein the insulating fibers of the main body are entangled.

10. The secondary battery according to claim 1, wherein the insulating fibers of the main body are entangled without having directivity to form a non-woven fabric.

* * * * *